US011108699B2

(12) United States Patent
Ji et al.

(10) Patent No.: US 11,108,699 B2
(45) Date of Patent: Aug. 31, 2021

(54) METHOD, APPARATUS, AND SYSTEM FOR IMPLEMENTING RATE ADJUSTMENT AT TRANSMIT END

(71) Applicant: HUAWEI TECHNOLOGIES CO., LTD., Shenzhen (CN)

(72) Inventors: Zhigang Ji, Beijing (CN); Yali Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/716,802

(22) Filed: Dec. 17, 2019

(65) Prior Publication Data

US 2020/0127929 A1 Apr. 23, 2020

Related U.S. Application Data

(63) Continuation of application No. PCT/CN2018/093206, filed on Jun. 28, 2018.

(30) Foreign Application Priority Data

Jun. 30, 2017 (CN) ........................ 201710532806.9

(51) Int. Cl.

*H04L 12/28* (2006.01)
*H04L 12/825* (2013.01)
*H04L 12/841* (2013.01)

(52) U.S. Cl.

CPC ............ *H04L 47/263* (2013.01); *H04L 47/28* (2013.01)

(58) Field of Classification Search

None

See application file for complete search history.

(56) References Cited

U.S. PATENT DOCUMENTS

2007/0070959 A1* 3/2007 Almeroth ................ H04L 67/12 370/338
2009/0180379 A1 7/2009 Leung et al.
2014/0105035 A1 4/2014 Lam et al.
2015/0138970 A1 5/2015 Tabatabaee et al.
2015/0236955 A1 8/2015 Bottorff et al.

(Continued)

FOREIGN PATENT DOCUMENTS

CN 1913663 A 2/2007
CN 101645765 A 2/2010

(Continued)

*Primary Examiner* — Elisabeth Benoit Magloire
(74) *Attorney, Agent, or Firm* — Maier & Maier, PLLC

(57) ABSTRACT

A method, an apparatus, and a system for implementing rate adjustment at a transmit end. The method includes: receiving, by a first network device, a first data packet sent by a previous-hop network device, where the first data packet includes a first required rate, a first deadline, and a first sending rate that correspond to a first data stream; obtaining, by the first network device, a second sending rate of the first data stream; and sending, by the first network device, a feedback packet to a second network device when the second sending rate is less than the first sending rate, where the feedback packet includes the second sending rate, and the feedback packet is used to instruct the second network device to inform, based on the second sending rate, the transmit end to adjust a rate for sending the first data stream.

12 Claims, 7 Drawing Sheets

First network device

Second network device

Transmit end

401. The first network device receives a first data packet sent by a previous-hop network device 402. The first network device obtains a second sending rate of a first data stream based on a first required rate and a first deadline that correspond to the first data stream, and a second required rate and a second deadline that correspond to a second data stream 403. The first network device sends a feedback packet to the second network device based on a magnitude relationship between the second sending rate and a first sending rate 404. The second network device instructs the transmit end to adjust a rate for sending the first data stream

(56) References Cited

U.S. PATENT DOCUMENTS

2016/0087899 A1* 3/2016 Katevenis ............... H04L 47/22
370/230
2016/0205026 A1 7/2016 Zhovnirnovsky et al.
2016/0285727 A1* 9/2016 Yl ......................... H04W 52/18
2016/0330123 A1* 11/2016 Mena de la Cruz ... H04L 47/27
2018/0077068 A1* 3/2018 Dhanabalan ........ H04L 47/2433
2018/0332342 A1* 11/2018 Wu .................. H04N 21/43637
2019/0075189 A1* 3/2019 Chen ..................... H04W 36/18

FOREIGN PATENT DOCUMENTS

CN 101919214 A 12/2010
CN 103763213 A 4/2014
CN 104718734 A 6/2015
CN 106330756 A 1/2017
WO 2015/078491 A1 6/2015

* cited by examiner

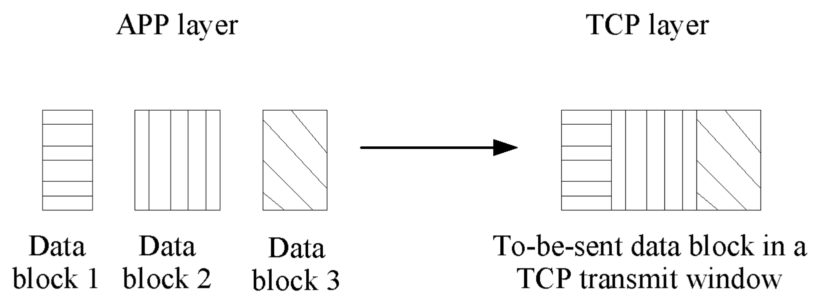
FIG. 7
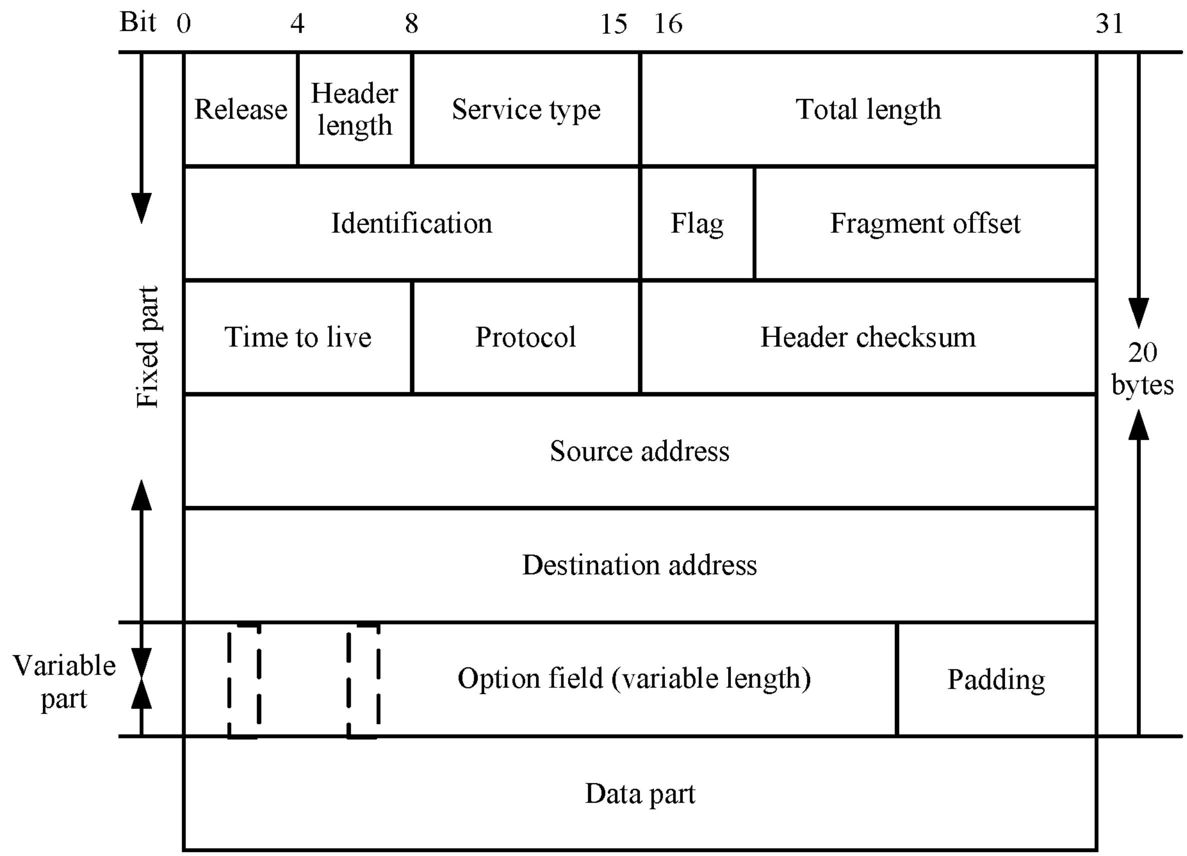
FIG. 8
| Level | Number | Length | Description |
|---|---|---|---|
| 0 | 10 | Six bytes | A required rate and a deadline each occupy two bytes |
FIG. 9

| Level | Number | Length | Description |
|---|---|---|---|
| 0 | 11 | Seven bytes | A first rate occupies two bytes |

| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|---|---|---|---|---|---|---|---|---|---|---|---|---|---|---|
| 1 | 0 | 0 | 0 | 1 | 0 | 1 | 1 | 0 | 0 | 0 | 0 | 0 | 1 | 1 | 1 | 1 | R | R | R | R | R | R | R | 0 | 0 | 0 | 0 | 0 | 0 | 0 | 0 |
| 0 | 0 | 0 | 0 | 0 | 0 | 0 | 0 | G | G | G | G | G | G | G | G | G | G | G | G | G | G | G | G | | | | | | | | |

METHOD, APPARATUS, AND SYSTEM FOR IMPLEMENTING RATE ADJUSTMENT AT TRANSMIT END

CROSS-REFERENCE TO RELATED APPLICATIONS

This application is a continuation of International Application No. PCT/CN2018/093206, filed on Jun. 28, 2018, which claims priority to Chinese Patent Application No. 201710532806.9, filed on Jun. 30, 2017. The disclosures of the aforementioned applications are hereby incorporated by reference in their entireties.

TECHNICAL FIELD

This application relates to the communications field, and in particular, to a method, an apparatus, and a system for implementing rate adjustment at a transmit end.

BACKGROUND

An existing network device has a limited capability for processing a data stream. When network congestion occurs, the network device performs fair processing on all data streams that pass through the network device. For example, a data stream with a short deadline and a data stream with a long deadline are allocated a same sending rate. In this case, data may be lost, a delay may be increased, a throughput may be reduced, or in a serious case, even congestion collapse may occur.

To reduce network congestion, a congestion point of network congestion needs to be fed back in time. In the prior art, congestion feedback in a network can be implemented by using a packet loss mechanism or an explicit congestion notification (ECN) mechanism. The packet loss mechanism means that when network congestion occurs in a network device, data packets of some data streams are discarded initiatively, so that a receive end learns that congestion occurs in the network device. The ECN mechanism means that when network congestion occurs in a network device, a congestion identifier is added to a data packet of a data stream, so that a receive end learns that congestion occurs in the network device.

However, both the packet loss mechanism and the ECN mechanism are end-to-end feedback, that is, the feedback from a receive end to a transmit end. In this feedback mechanism, a long feedback period is required and congestion is not fed back in time.

SUMMARY

Embodiments provide a method for implementing rate adjustment at a transmit end to resolve a problem of a long congestion feedback period and delayed congestion feedback.

According to one aspect, an embodiment provides a method for implementing rate adjustment at a transmit end, including: receiving, by a first network device, a first data packet sent by a previous-hop network device, where the first data packet includes a first required rate, a first deadline, and a first sending rate that correspond to a first data stream, and the first sending rate is used to indicate a minimum sending rate of the first data stream that is obtained by the previous-hop network device; obtaining, by the first network device, a second sending rate of the first data stream based on the first required rate and the first deadline that correspond to the first data stream, and a second required rate and a second deadline that correspond to a second data stream; and sending, by the first network device, a feedback packet to a second network device when the second sending rate is less than the first sending rate, where the feedback packet includes the second sending rate, and the feedback packet is used to instruct the second network device to inform, based on the second sending rate, the transmit end to adjust a rate for sending the first data stream. In this way, when the first network device determines that the first sending rate is greater than or equal to the second sending rate, the first network device may send the feedback packet to the second network device through which the first data stream passes, where the feedback packet includes the second sending rate. After receiving the feedback packet, the second network device may instruct the transmit end to adjust the rate for sending the first data stream. Compared with the prior art in which end-to-end feedback is required, in this embodiment, before the first data packet of the first data stream arrives at a peer end, the feedback packet is used to instruct the second network device to inform the transmit end to adjust the rate of the first data stream, so that a feedback time is shortened, and a problem of a long congestion feedback period and delayed congestion feedback caused by end-to-end feedback can be resolved.

In a possible embodiment, the foregoing method further includes: sending, by the first network device, a second data packet to a next-hop network device, where the second data packet includes the first required rate, the first deadline, and the second sending rate. In this way, the next-hop network device of the first network device may determine a second sending rate of the next-hop network device based on the first required rate and the first deadline, and compare the sending rate determined by the next-hop network device with the second sending rate, to determine a smaller one of the sending rate determined by the next-hop network device and the received sending rate. Then, the next-hop network device of the first network device may send the determined smaller rate to the second network device, and then the second network device may instruct the transmit end to adjust the rate for sending the first data stream, thereby resolving a problem of a long congestion feedback period and delayed congestion feedback caused by end-to-end feedback.

In a possible embodiment, the foregoing method further includes: when the second sending rate is greater than or equal to the first sending rate, skipping sending, by the first network device, the feedback packet. Because the first network device is not a currently most congested network device, the first network device may not send the feedback packet, so as to store a bandwidth.

In a possible embodiment, the foregoing method further includes: sending, by the first network device, a second data packet to a next-hop network device, where the second data packet includes the first required rate, the first deadline, and the first sending rate. In this way, the next-hop network device of the first network device may determine a second sending rate of the next-hop network device based on the first required rate and the first deadline, and compare the second sending rate determined by the next-hop network device with the received first sending rate, to determine a smaller one of the second sending rate determined by the next-hop network device and the received first sending rate. Then, the next-hop network device of the first network device may send the determined smaller rate to the second network device, and then the second network device may instruct the transmit end to adjust the rate for sending the first data stream, thereby resolving a problem of a long congestion feedback period and delayed congestion feedback caused by end-to-end feedback.

According to another aspect, an embodiment provides a method for implementing rate adjustment at a transmit end, including: receiving, by a second network device, a feedback packet sent by a first network device, where the feedback packet includes a second sending rate, and the second sending rate is used to indicate a sending rate of a first data stream that is obtained by the first network device; and when the second sending rate is less than a third sending rate, instructing, by the second network device, the transmit end to reduce a rate for sending the first data stream, where the third sending rate is a minimum sending rate of the first data stream that is stored for the last time by the second network device. The second network device is a first-hop network device through which the first data stream passes. In other words, the first-hop network device of the first data stream may instruct, based on the second sending rate included in the received feedback packet, the transmit end to reduce the rate for sending the first data stream. Compared with the prior art in which end-to-end feedback is required, in this embodiment, before the first data packet of the first data stream arrives at a peer end, the transmit end may reduce the rate for sending the first data stream, so that a feedback time is shortened, and a problem of a long congestion feedback period and delayed congestion feedback caused by end-to-end feedback can be resolved.

In a possible embodiment, the instructing, by the second network device, of the transmit end to reduce a rate for sending the first data stream includes: sending, by the second network device, an acknowledgment packet to the transmit end, where the acknowledgment packet includes a first receiver window (RWND), the first RWND is less than a second RWND, and the second RWND is used to indicate an RWND carried in a reverse data packet corresponding to a data packet of the first data stream. Therefore, the transmit end may reduce the rate for sending the first data stream, to relieve congestion in a network.

In a possible embodiment, the foregoing method further includes: when the second sending rate is greater than the third sending rate, instructing, by the second network device, the transmit end to increase the rate for sending the first data stream, to improve network transmission performance.

In a possible embodiment, the instructing, by the second network device, of the transmit end to increase the rate for sending the first data stream includes: sending, by the second network device, an acknowledgment packet to the transmit end, where the acknowledgment packet includes a third RWND, the third RWND is greater than a second RWND, and the second RWND is used to indicate an RWND carried in a reverse data packet corresponding to a data packet of the first data stream. Therefore, the transmit end may increase the rate for sending the first data stream, to improve network transmission performance.

According to still another aspect, an embodiment provides a first network device, including: a receiving unit configured to receive a first data packet sent by a previous-hop network device, where the first data packet includes a first required rate, a first deadline, and a first sending rate that correspond to a first data stream, and the first sending rate is used to indicate a minimum sending rate of the first data stream that is obtained by the previous-hop network device; a processing unit configured to obtain a second sending rate of the first data stream based on the first required rate and the first deadline that correspond to the first data stream, and a second required rate and a second deadline that correspond to a second data stream; and a sending unit configured to send a feedback packet to a second network device when the second sending rate is less than the first sending rate, where the feedback packet includes the second sending rate, and the feedback packet is used to instruct the second network device to inform, based on the second sending rate, a transmit end to adjust a rate for sending the first data stream.

In a possible embodiment, the sending unit is further configured to send a second data packet to a next-hop network device, where the second data packet includes the first required rate, the first deadline, and the second sending rate.

In a possible embodiment, the sending unit is further configured to skip sending the feedback packet when the second sending rate is greater than or equal to the first sending rate.

In a possible embodiment, the sending unit is further configured to send a second data packet to a next-hop network device, where the second data packet includes the first required rate, the first deadline, and the first sending rate.

According to still another aspect, an embodiment provides a second network device, including: a receiving unit configured to receive a feedback packet sent by a first network device, where the feedback packet includes a second sending rate, and the second sending rate is used to indicate a sending rate of a first data stream that is obtained by the first network device; and a sending unit configured to: when the second sending rate is less than a third sending rate, instruct a transmit end to reduce a rate for sending the first data stream, where the third sending rate is a minimum sending rate of the first data stream that is stored for the last time.

In a possible embodiment, the sending unit is configured to send an acknowledgment packet to the transmit end, where the acknowledgment packet includes a first RWND, the first RWND is less than a second RWND, and the second RWND is used to indicate an RWND carried in a reverse data packet corresponding to a data packet of the first data stream.

In a possible embodiment, the sending unit is further configured to: when the second sending rate is greater than the third sending rate, instruct the transmit end to increase the rate for sending the first data stream.

In a possible embodiment, the sending unit is further configured to send an acknowledgment packet to the transmit end, where the acknowledgment packet includes a third RWND, the third RWND is greater than a second RWND, and the second RWND is used to indicate an RWND carried in a reverse data packet corresponding to a data packet of the first data stream.

According to still another aspect, an embodiment provides a first network device, including: a transceiver configured to receive a first data packet sent by a previous-hop network device, where the first data packet includes a first required rate, a first deadline, and a first sending rate that correspond to a first data stream, and the first sending rate is used to indicate a minimum sending rate of the first data stream that is obtained by the previous-hop network device; and a processor configured to obtain a second sending rate of the first data stream based on the first required rate and the first deadline that correspond to the first data stream, and a second required rate and a second deadline that correspond to a second data stream, where the transceiver is configured to send a feedback packet to a second network device when the second sending rate is less than the first sending rate, where the feedback packet includes the second sending rate, and the feedback packet is used to instruct the second network device to inform, based on the second sending rate, a transmit end to adjust a rate for sending the first data stream.

In a possible embodiment, the transceiver is further configured to send a second data packet to a next-hop network device, where the second data packet includes the first required rate, the first deadline, and the second sending rate.

In a possible embodiment, the transceiver is further configured to skip sending the feedback packet when the second sending rate is greater than or equal to the first sending rate.

In a possible embodiment, the transceiver is further configured to send a second data packet to a next-hop network device, where the second data packet includes the first required rate, the first deadline, and the first sending rate.

According to still another aspect, an embodiment provides a second network device, including: a transceiver configured to receive a feedback packet sent by a first network device, where the feedback packet includes a second sending rate, and the second sending rate is used to indicate a sending rate of a first data stream that is obtained by the first network device, where the transceiver is configured to: when the second sending rate is less than a third sending rate, instruct a transmit end to reduce a rate for sending the first data stream, where the third sending rate is a minimum sending rate of the first data stream that is stored for the last time.

In a possible embodiment, the transceiver is configured to send an acknowledgment packet to the transmit end, where the acknowledgment packet includes a first RWND, the first RWND is less than a second RWND, and the second RWND is used to indicate an RWND carried in a reverse data packet corresponding to a data packet of the first data stream.

In a possible embodiment, the transceiver is further configured to: when the second sending rate is greater than the third sending rate, instruct the transmit end to increase the rate for sending the first data stream.

In a possible embodiment, the transceiver is further configured to send the acknowledgment packet to the transmit end, where the acknowledgment packet includes a third RWND, the third RWND is greater than a second RWND, and the second RWND is used to indicate an RWND carried in a reverse data packet corresponding to a data packet of the first data stream.

According to still another aspect, an embodiment provides a system for implementing rate adjustment at a transmit end, including a first network device and a second network device. The first network device is configured to: receive a first data packet sent by a previous-hop network device, where the first data packet includes a first sending rate; obtain a second sending rate of a first data stream; and send a feedback packet to the second network device when the second sending rate is less than the first sending rate, where the feedback packet includes the second sending rate. The second network device is configured to: when the second sending rate is less than a third sending rate, instruct the transmit end to reduce a rate for sending the first data stream, where the third sending rate is a minimum sending rate of the first data stream that is stored for the last time by the second network device.

According to still another aspect, an internet protocol (IP) data packet format is provided, and a header of the IP data packet format may be used to carry a first sending rate or a second sending rate.

In a possible implementation, an IP data packet format is provided, and an option field in the header of the IP data packet format may be used to carry the first sending rate or the second sending rate.

In still another aspect, an embodiment provides a computer storage medium configured to store computer software instructions used by the foregoing first network device. The computer storage medium contains a program designed for executing the foregoing aspects.

In still another aspect, an embodiment provides a computer storage medium configured to store computer software instructions used by the foregoing second network device. The computer storage medium contains a program designed for executing the foregoing aspects.

Therefore, when the first network device determines that the first sending rate is greater than or equal to the second sending rate, the first network device may send the feedback packet to the second network device, where the feedback packet includes the second sending rate. After receiving the feedback packet, the second network device may instruct, based on the second sending rate and the third sending rate that is stored by the second network device, the transmit end to reduce or increase the rate for sending the first data stream. Compared with the prior art in which end-to-end feedback is required, in the embodiments, before the first data packet of the first data stream arrives at a peer end, the second network device may instruct the transmit end to adjust the rate of the first data stream, so that a feedback time is shortened, and a problem of a long congestion feedback period and delayed congestion feedback caused by end-to-end feedback can be resolved.

BRIEF DESCRIPTION OF DRAWINGS

FIG. 7 is a schematic diagram of converting a data block from an application layer to a TCP layer according to an embodiment;

FIG. 8 is a schematic diagram of an IP packet header format according to an embodiment;

FIG. 9 is a schematic diagram of a format of an option A according to an embodiment;

Figures 10A, 10B, 11:
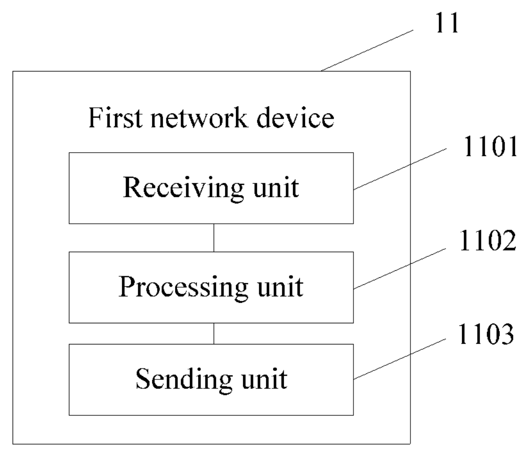
Figure 12:
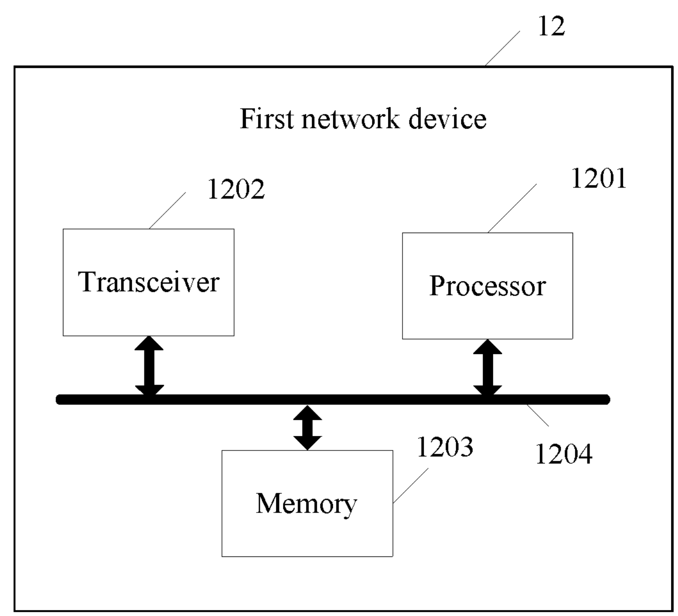
Figure 13:
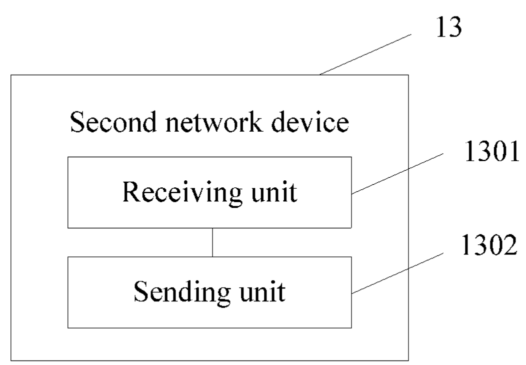
Figure 14:
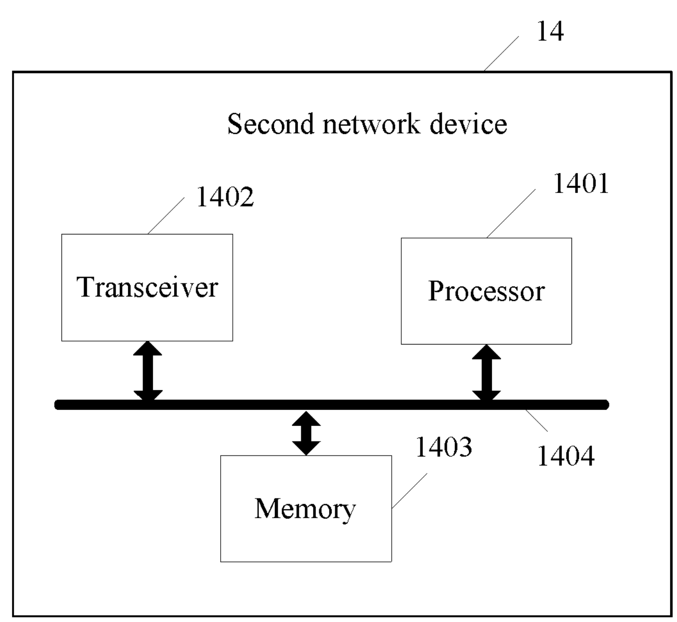

FIG. **10*a*** is a schematic diagram of a format of an option B according to an embodiment;

FIG. **10*b*** is a schematic structural diagram of an option B according to an embodiment;

FIG. 11 is a schematic structural diagram of a first network device according to an embodiment;

FIG. 12 is a schematic structural diagram of a first network device according to an embodiment;

FIG. 13 is a schematic structural diagram of a second network device according to an embodiment; and FIG. 14 is a schematic structural diagram of a second network device according to an embodiment.

DETAILED DESCRIPTION OF EMBODIMENTS

Embodiments may be applied to congestion feedback and rate adjustment of a network, for example, may be applied to congestion feedback and rate adjustment of a layer-2 network or a layer-3 network. For example, it is assumed that a transmit end is a user host A, and a receive end is a user host B. The user host A can send a first data stream to the user host B by using an intermediate network device, and the intermediate network device is a network device through which the first data stream passes. It is assumed that a second network device is a device C, a second-hop network device is a device D, and a third-hop network device is a device E, and when congestion occurs in at least one of the device C, the device D, and the device E, the network device in which the congestion occurs may send a feedback packet to the network device C, so that the network device C can feed back the congestion to the user host A and instruct the user host A to adjust a rate.

Figure 1:
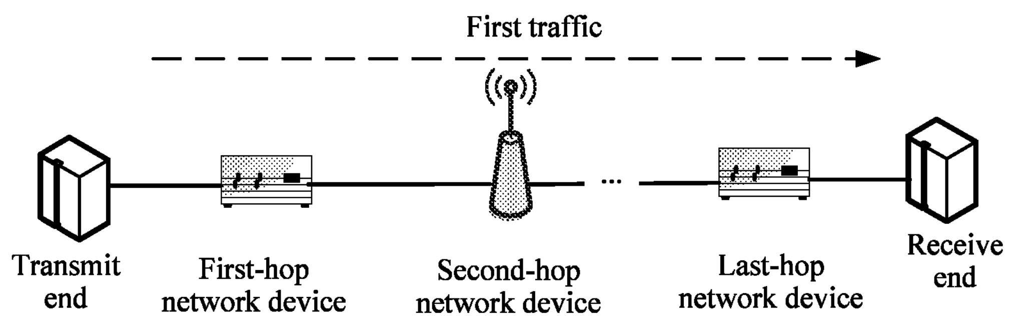
FIG. 1 is a schematic diagram of a system architecture according to an embodiment.

A system architecture in an embodiment may include a second network device, a first network device, a transmit end, and a receive end. As shown in FIG. 1, the second network device is a first-hop network device through which a first data stream passes, and the second network device is connected to the transmit end. The first network device may be a second-hop network device, a third-hop network device, . . . , or a last-hop network device through which the first data stream passes. The first network device or the second network device may be a router, a switch (SW), a virtual switch (VS), or the like. A transmit end of the first data stream or a receive end of the first data stream may be a user host, a server, or the like.

Figure 2:
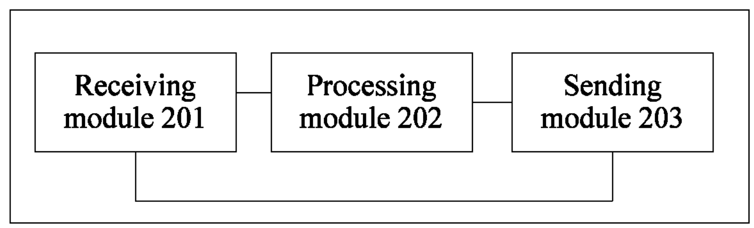
FIG. 2 is a schematic diagram of an internal structure of a first network device according to an embodiment.

FIG. 2 is a schematic diagram of an internal structure of a first network device according to this application. In this embodiment, the first network device may include a receiving module 201, a processing module 202, and a sending module 203. Further, in this embodiment, the receiving module 201 is configured to receive a first data packet sent by a previous-hop network device, and the first data packet includes a first required rate, a first deadline, and a first sending rate that correspond to a first data stream. The processing module 202 is configured to obtain a second sending rate of the first data stream based on the first required rate and the first deadline that correspond to the first data stream, and a second required rate and a second deadline that correspond to a second data stream. The sending module 203 is configured to send a feedback packet to a second network device based on a magnitude relationship between the second sending rate and the first sending rate.

The first data stream may include a plurality of data packets, and the first data packet may be one of the plurality of data packets. The second data stream may also include a plurality of data packets, but the data packets included in the second data stream are different from the data packets included in the first data stream.

Figure 3:
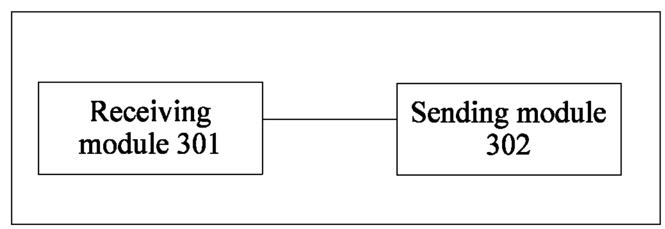
FIG. 3 is a schematic diagram of an internal structure of a second network device according to an embodiment.

FIG. 3 is a schematic diagram of an internal structure of a second network device according to the embodiments. Here, the second network device may include a receiving module 301 and a sending module 302. The receiving module 301 is configured to receive a feedback packet sent by a first network device, and the feedback packet may include a first sending rate or a second sending rate. The sending module 302 is configured to: when the second sending rate is less than a third sending rate, instruct a transmit end to reduce a rate for sending a first data stream. The third sending rate is a minimum rate stored for the last time by the second network device.

Figure 4:
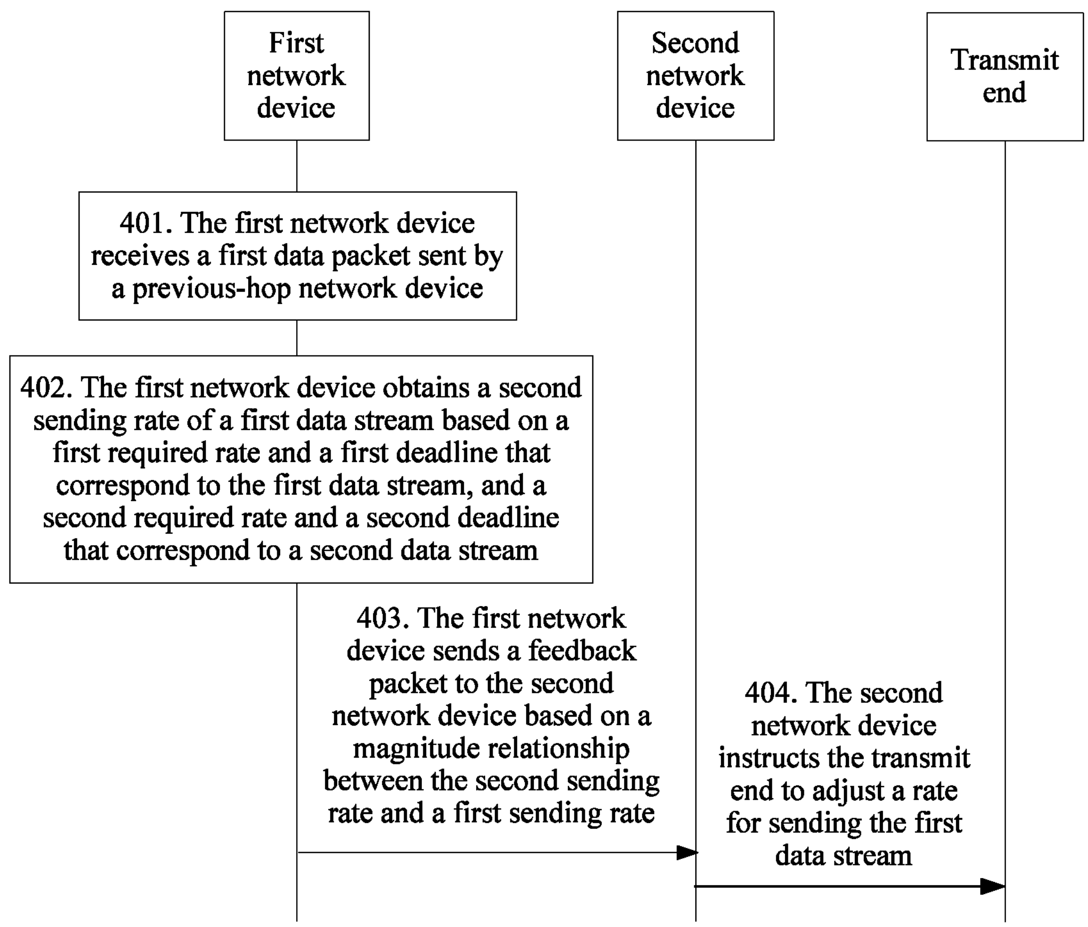
FIG. 4 is a schematic diagram of signal interaction of a method for implementing rate adjustment at a transmit end according to an embodiment.

The following provides a method for implementing rate adjustment at a transmit end. As shown in FIG. 4, the method includes the following steps.

Step 401. A first network device receives a first data packet sent by a previous-hop network device.

The first data packet includes a first required rate, a first deadline, and a first sending rate that correspond to a first data stream. The first required rate is a required rate for sending the first data stream, and the first deadline is a deadline for sending the first data stream. The first sending rate is used to indicate a minimum sending rate of the first data stream that is obtained by the previous-hop network device.

Step 402. The first network device obtains a second sending rate of the first data stream based on the first required rate and the first deadline that correspond to the first data stream, and a second required rate and a second deadline that correspond to a second data stream.

The second required rate is a required rate for sending the second data stream, and the second deadline is a deadline for sending the second data stream.

It may be understood that the first network device may simultaneously receive data packets of a plurality of data streams. Therefore, the first network device may simultaneously obtain second sending rates of the plurality of data streams based on required rates and deadlines that are carried in the plurality of data packets. A plurality of second sending rates obtained by the first network device include the second sending rate of the first data stream.

For example, it is assumed that the first network device is a device A, and the device A may simultaneously receive a data packet of the first data stream that is sent by a device B and a data packet of the second data stream that is sent by a device C. The data packet of the first data stream carries the first required rate and the first deadline of the first data stream, and the data packet of the second data stream carries the second required rate and the second deadline of the second data stream. The device A may obtain the second sending rate of the first data stream or the second sending rate of the second data stream based on the first required rate and the first deadline, and the second required rate and the second deadline.

Step 403. The first network device sends a feedback packet to a second network device based on a magnitude relationship between the second sending rate and the first sending rate.

The second network device is a first-hop network device that sends the first data stream.

When the first network device determines that the second sending rate is less than the first sending rate, the first network device sends the feedback packet to the second network device, where the feedback packet includes the second sending rate.

When the first network device determines that the second sending rate is greater than or equal to the first sending rate, the first network device may not send the feedback packet to the second network device.

Step 404. The second network device instructs the transmit end to adjust a rate for sending the first data stream.

When the first sending rate is less than a third sending rate, the second network device instructs the transmit end to reduce the rate. The third sending rate is a minimum sending rate of the first data stream that is stored for the last time by the second network device. When the first sending rate is greater than the third sending rate, the second network device instructs the transmit end to increase the rate.

When the second sending rate is less than the third sending rate, the second network device instructs the transmit end to reduce the rate. When the second sending rate is greater than the third sending rate, the second network device instructs the transmit end to increase the rate.

In a possible implementation, the second network device instructing the transmit end to reduce the rate includes: sending, by the second network device, an acknowledgment packet to the transmit end, where the acknowledgment packet includes a first RWND, the first RWND is less than a second RWND, and the second RWND is used to indicate an RWND carried in a reverse data packet corresponding to the data packet of the first data stream. The second network device instructing the transmit end to increase the rate includes: sending, by the second network device, an acknowledgment packet to the transmit end, where the acknowledgment packet includes a third RWND, and the third RWND is greater than a second RWND.

Therefore, when the first network device determines that the first sending rate is greater than or equal to the second sending rate, the first network device may send the feedback packet to the second network device, where the feedback packet includes the second sending rate. After receiving the feedback packet, the second network device may send the acknowledgment packet to the transmit end, so that the transmit end increases or reduces, based on the acknowledgment packet, the rate for sending the first data stream. Compared with the prior art in which end-to-end feedback is required, in this embodiment, before the first data packet of the first data stream arrives at a peer end, an intermediate first network device sends a feedback packet to the second network device of the first data stream, to cause the transmit end to adjust the rate of the first data stream, so that a feedback time is shortened and a problem of a long congestion feedback period and delayed congestion feedback caused by end-to-end feedback is resolved.

Figure 5:
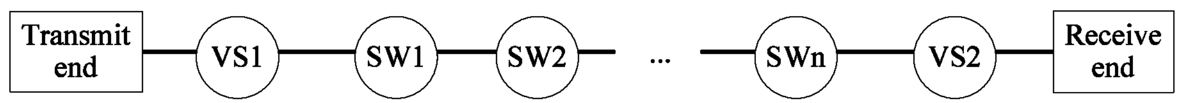
FIG. 5 is a schematic diagram of an architecture according to an embodiment.

FIG. 5 is a schematic diagram of an architecture of a method for implementing rate adjustment at a transmit end. The architecture may include a transmit end, a receive end, a VS1, a VS2, an SW1, an SW2, . . . , or an SWn. For the transmit end, it may be assumed that a second network device is the VS1, and a first network device may be the SW1, the SW2, . . . , the SWn, or the VS2.

Figure 6:
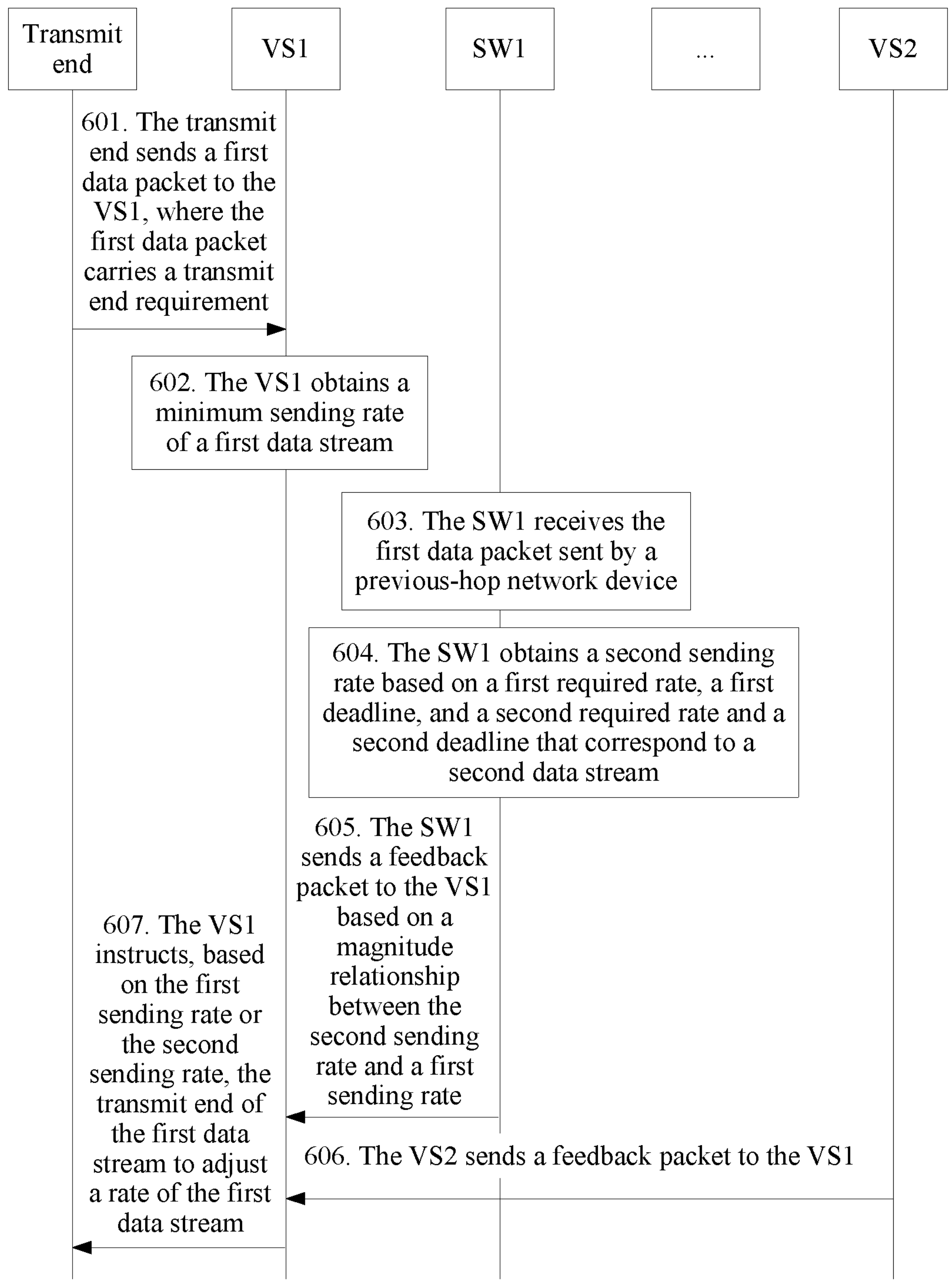
FIG. 6 is a schematic diagram of signal interaction of a method for implementing rate adjustment at a transmit end according to an embodiment.

The following provides a method for implementing rate adjustment at a transmit end. The architecture shown in FIG. 5 is used as an example for description. As shown in FIG. 6, the method includes the following steps.

Step 601. The transmit end sends a first data packet to the VS1, where the first data packet carries a transmit end requirement.

The transmit end requirement may include a first required rate and a first deadline that are of a first data stream and that are sent by the transmit end. The first required rate and the first deadline are a required rate and a deadline that correspond to a transmission control protocol (TCP) transmit window of the current first data stream.

A process of calculating the first required rate and the first deadline may be as follows: when submitting a to-be-sent data block to a TCP layer, an application layer of the transmit end simultaneously submits a required rate and a deadline that correspond to the data block. The TCP layer records a required rate requirement and a deadline requirement that correspond to each to-be-sent data block, and determines that the first required rate is a maximum value of the required rate of the to-be-sent data block in the current TCP transmit window. The first deadline is a sum of the deadlines of the to-be-sent data blocks in the current TCP transmit window.

As shown in FIG. 7, a data block 1, a data block 2, and a data block 3 respectively correspond to different required rates and deadlines. It can be assumed that the to-be-sent data block in the current TCP transmit window is a sum of the data block 1, the data block 2, and the data block 3. In this case, the maximum value of the required rate of the to-be-sent data block in the current TCP transmit window is a maximum value in the required rates corresponding to the data block 1, the data block 2, and the data block 3. A sum of the deadlines of the to-be-sent data blocks in the current TCP transmit window is a sum of the deadlines corresponding to the data block 1, the data block 2, and the data block 3.

The first required rate and the first deadline may be carried in an option field of an IP packet header of the first data packet, for example, carried in an option A field. FIG. 8 shows a format of the IP packet header. The first 20 bytes of the packet header are fixed, and latter bytes are variable.

Release: occupies four bits, indicating a release number of an IP protocol. Currently, a main release is IPv4, namely, a fourth release number. In communication, both communication parties need to have a same IP protocol release number; otherwise, if the communication parties do not have a same IP protocol release number, the communication parties cannot communicate with each other.

Header length: occupies four bits, indicating a length of the IP packet header. Because a maximum length (that is, each of the four bits is 1) is 15 length units, and each length unit is four bytes, the maximum length of the IP protocol packet header is 60 bytes, and a minimum length is 20 bytes shown in FIG. 8.

Service type: occupies eight bits, where the first three bits indicate a priority of the packet, and the subsequent several bits respectively indicate requirements of a lower delay, a higher throughput, higher reliability, lower routing costs, and the like.

Total length: occupies 16 bits, indicating a total length of the packet. Note that the unit herein is a byte instead of four bytes. Therefore, a maximum length of an IP packet is 65535 bytes.

Identification: this field marks a sequence number of a current fragment.

Flag: this field is used to mark whether the packet is a fragment (some packets may not need to be fragmented or are not intended to be fragmented), and whether there is a fragment behind (whether it is the last fragment).

Fragment offset: indicates an offset of the current fragment relative to a user data field in an original data packet (a data packet before the fragmentation), that is, a relative location in the original data packet.

Time to live (TTL): this field indicates how long a current packet can survive. Each time 1 ms elapses or the packet passes through one gateway, a TTL value is automatically reduced by 1, and, when the time to live is zero, the packet is discarded because it is considered that the packet cannot reach a destination host.

Protocol: this field indicates a protocol used at an upper layer (the transport layer of network 7-layer structure or of TCP/IP), a possible protocol TCP, a user datagram protocol (UDP), an internet control message protocol (ICMP), an internet group management protocol (IGMP), an interior gateway protocol (IGP), and the like.

Header checksum: is used to check whether an error occurs in the IP packet header during propagation, and mainly checks whether one or more bits in the packet header are modified.

Source IP address: occupies 32 bits, namely, four bytes, where each byte is an integer between 0 and 255, namely, a commonly seen IP address format.

Destination IP address: occupies 32 bits, namely, four bytes, where each byte is an integer between 0 and 255, namely, a commonly seen IP address format.

Options: with a variable quantity of bits, may include a plurality of options, such as an option A and an option B, used to mark special information of a network device.

For example, a format of the option A may be shown in FIG. 9. In this embodiment, a level of the option A is 0, a number is 10, and a length is six bytes. The first required rate and the first deadline may each occupy two bytes, and the other two bytes may be defined or occupied.

Step 602. The VS1 obtains a minimum sending rate of the first data stream.

First, the VS1 may determine a sending rate of the VS1 based on the first required rate, the first deadline, and a second required rate and a second deadline that correspond to a second data stream. The sending rate of the VS1 is a local device (VS1)—assigned rate (or "local device-assigned rate").

It may be understood that the VS1 may simultaneously receive data packets of a plurality of data streams. In other words, in addition to a data packet corresponding to the first data stream, the VS1 may further receive a data packet corresponding to the second data stream. The VS1 may separately determine one local device-assigned rate for each data stream. In this embodiment, a process in which the VS1 determines the local device-assigned rate for the first data stream is used as an example for description.

The VS1 first groups data packets based on egress ports corresponding to the data packets of the data streams. Data packets in a same group share an egress port bandwidth (or a configured maximum available bandwidth). Then, the VS1 comprehensively determines the sending rate of the VS1 based on required rates and deadlines of all data packets in the same group. The method is as follows:

1. A data packet with a smaller deadline in a same group has a sending rate that is closer to the required rate carried in the data packet. 2. Data packets in a same group have equal deadlines, and a data packet with a higher required rate has a sending rate that is closer to the required rate carried in the data packet. 3. When data packets in a same group have equal required rates, a data packet with a smaller value equal to a required rate*a deadline has a sending rate that is closer to the required rate carried in the data packet.

When the VS1 determines the sending rate of the VS1, the sending rate of the VS1 may be temporarily used as the minimum sending rate of the first data stream. The VS1 may add the minimum sending rate of the first data stream to an options field of the IP packet header of the first data packet.

For example, it is assumed that the VS1 adds the temporarily determined minimum sending rate of the first data stream to the option B field. A format of the option B is shown in FIG. 10*a*, where a level of the option B is 0, a number is 11, and a length is seven bytes. As shown in FIG. 10*b*, the first two bytes in the seven bytes of the option B are defined or occupied, the third byte is value, namely, a reserved byte (an R part), the fourth and the fifth bytes may be temporarily empty, and the sixth and the seventh bytes (that is, a G part) are used to carry the minimum sending rate of the first data stream.

Step 603. The SW1 receives the first data packet sent by a previous-hop network device.

It may be understood that the previous-hop network device of the SW1 is the VS1, and the first data packet sent by the VS1 includes the first required rate, the first deadline, and a first sending rate. The first sending rate herein is the local device-assigned rate of the first data stream that is determined by the VS1.

Step 604. The SW1 obtains a second sending rate based on the first required rate, the first deadline, and the second required rate and the second deadline that correspond to the second data stream.

The second sending rate is a sending rate determined by the SW1 for the first data stream. For a process in which the SW1 obtains the second sending rate, refer to step 602.

In addition, the SW1 may update, based on information carried in the first data packet, device entries corresponding to the SW1. The device entries corresponding to the SW1 are shown in Table 1:

TABLE 1

| Quintuple of the first data packet | First required rate | First deadline | Local device-assigned rate | Minimum sending rate of the first data stream | Idle timeout | Hard timeout |
|---|---|---|---|---|---|---|

It may be understood from Table 1 that the device entries corresponding to the SW1 may include: the quintuple of the data packet, the first required rate, the first deadline, the second sending rate, the minimum sending rate of the first data stream, the idle timeout, and the hard timeout. The quintuple of the data packet is a source IP address, a destination IP address, a protocol number, a source port, and a destination port of the first data packet. The column of the first required rate and the column of the first deadline are used to store the first required rate and the first deadline. The column of the local device-assigned rate is used to store the second sending rate obtained by the SW1. The column of the minimum sending rate of the first data stream is used to store a smaller one of the local device-assigned rate of the VS1 and the second sending rate obtained by the SW1. In other words, for a different network device, the minimum sending rate of the first data stream is different. Optionally, the SW1 may not update the column of the minimum sending rate of the first data stream. The idle timeout and the hard timeout are used to indicate whether a current data stream times out.

It can be noted that the VS1 may also have device entries, and the VS1 may temporarily store the local device-assigned rate determined by the VS1 in a column of the minimum sending rate of the first data stream.

In addition, the SW1 may recalculate the second sending rate of the data packet on the following four occasions: 1. the entries increase, such as data packets of a data stream increase; 2. the entries undergo an idle timeout, such as some data packets of the first data stream are suspended to transmit; 3. the entries are reactivated, such as transmission of the some data packets of the first data stream that are suspended to transmit is resumed; and 4. the columns of the required rate and the deadline are updated, such as the required rate and the deadline of the data packet of the first data stream are changed.

Step 605. The SW1 sends a feedback packet to the VS1 based on a magnitude relationship between the second sending rate and the first sending rate.

When the SW1 determines that the second sending rate is less than the local device-assigned rate of the first data stream that is determined by the VS1, the SW1 may send the feedback packet to the VS1, and the feedback packet may be a control packet. The control packet includes the second sending rate, such as the sending rate of the SW1. A function of the control packet is: enabling the VS1 to instruct in time the transmit end to adjust the rate. When the SW1 determines that the second sending rate is greater than the first sending rate, the SW1 may not send a control packet.

After receiving the control packet sent by the SW1, the VS1 may compare the second sending rate included in the feedback packet with the minimum sending rate of the first data stream that is stored in the VS1. If the second sending rate is less than the minimum sending rate of the first data stream that is stored in the VS1, the VS1 may instruct the transmit end to reduce the rate. Because the SW1 is currently a most congested network device (compared with the VS1), the VS1 may instruct the transmit end to reduce the rate.

In addition, after receiving the control packet sent by the SW1, the VS1 may correspondingly update the minimum sending rate of the first data stream that is stored in the VS1, such as it may update the column of the minimum sending rate of the first data stream in the device entries. The VS1 may store, in the column, the second sending rate included in the feedback packet of the SW1.

Optionally, when the SW1 determines that the second sending rate is greater than the first sending rate, the SW1 may send a control packet to the VS1, where the control packet includes the first sending rate, such as the minimum sending rate of the first data stream that is obtained by the VS1. In this case, after receiving the control packet sent by the SW1, the VS1 may not instruct the transmit end to adjust the rate, because the SW1 is not the most congested network device.

Optionally, when the SW1 determines that the second sending rate is greater than the first sending rate, the SW1 may not send a control packet.

When the control packet is transmitted by using an intermediate network device, the intermediate network device (VS1, VS2, SW1, SW2, . . . , or SWn) does not process the control packet. Only the VS1 intercepts the control packet and processes the control packet accordingly. The control packet is similar to an acknowledgement (ACK) packet of the data packet, but is slightly different from the ACK packet. For example, a difference between the control packet and the ACK packet may be: a first bit of a value of a specific option (for example, the option B) in an IP packet header in the control packet is set to 1, while a first bit of a value of the specific option in the ACK packet is set to 0. As shown in FIG. 10*b*, the SW1 may write the second sending rate or the first sending rate into the sixth and seventh bytes (that is, the G part) in the option B.

In addition, the SW1 may send a second data packet to the SW2. When the second sending rate is less than the first sending rate, the second data packet includes the first required rate, the first deadline, and the second sending rate. When the second sending rate is greater than or equal to the first sending rate, the second data packet includes the first required rate, the first deadline, and the first sending rate.

A format of the second data packet is similar to that of the first data packet, and the sixth and the seventh bytes of the option B of the second data packet carry a smaller one of the first sending rate and the second sending rate.

Similarly, when the first network device is respectively SW2, SWn, step 603 to step 605 may be cyclically performed.

Step 606. The VS2 sends a feedback packet to the VS1.

When the VS2 determines that the second sending rate (that is, a sending rate of the first data stream that is obtained by the VS2) is less than the first sending rate (that is, the minimum sending rate of the first data stream that is determined by the SWn), the VS2 sends the feedback packet to the VS1, where the feedback packet includes the second sending rate.

The VS2 may add the second sending rate to the feedback packet and send the feedback packet to the VS1. The feedback packet herein may be a reverse data packet. In this embodiment, the VS2 may intercept a reverse data packet corresponding to a current data packet (that is, an ACK data packet of the current data packet), and write the first sending rate or the second sending rate into the sixth and seventh bytes (that is, the G part in FIG. 10*b*) in the option B in the IP packet header of the ACK data packet.

Optionally, the VS2 may feed back the second sending rate to the VS1 by using the control packet. In this embodiment, the VS2 may write the second sending rate into the sixth and seventh bytes (that is, the G part) in the option B in the IP packet header of the control packet.

Step 607. The VS1 instructs the transmit end of the first data stream to adjust a rate for sending the first data stream.

Here, the VS1 may compare the minimum sending rate (a third sending rate) of the first data stream that is stored in the VS1 for the last time with the second sending rate (that is, a sending rate of the first data stream that is obtained by the VS2) carried in the reverse data packet. The minimum sending rate stored for the last time may be determined by the VS1 based on the control packet sent by each network device (that is, SW1 . . . , and SWn). In other words, the third sending rate may be a value updated for the last time in the column of the minimum sending rate of the first data stream of the device entries of the VS1. When the second sending rate is less than the third sending rate, the VS1 instructs the transmit end to reduce the rate. When the second sending rate is greater than the third sending rate, the VS1 instructs the transmit end to increase the rate.

A reason why the first sending rate or the second sending rate carried in the reverse data packet may be greater than the third sending rate is a possible change occurring in the network. Because the second sending rate determined by at least one of the SW1 . . . , and SWn is changed, the rate added by the VS2 to the reverse data packet is changed accordingly. In this case, the VS1 may instruct the transmit end to increase the rate.

When the VS1 instructs the transmit end to reduce the rate for sending the first data stream, the VS1 sends an acknowledgment packet to the transmit end. The acknowledgment packet includes a first RWND, the first RWND is less than a second RWND, and the second RWND is used to indicate an RWND carried in the reverse data packet corresponding to the data packet of the first data stream. The first RWND=the second sending rate*a round-trip time (RTT). The RTT is a difference between a time when the VS1 sends a forward data packet and a time when a reverse ACK packet corresponding to the forward data packet arrives at the VS1. Then, the VS1 modifies the second RWND in the reverse ACK packet to the currently determined first RWND, so that the transmit end can reduce the rate.

Similarly, when the VS1 instructs the transmit end to increase the rate for sending the first data stream, the VS1 sends an acknowledgment packet to the transmit end. The acknowledgment packet includes a third RWND, and the third RWND is greater than a second RWND. The third RWND=the second sending rate*a RTT. The RTT is a difference between a time when the VS1 sends a forward data packet and a time when a reverse ACK packet corresponding to the forward data packet arrives at the VS1. Then, the VS1 modifies the second RWND in the reverse ACK packet to the currently determined third RWND, so that the transmit end can increase the rate.

It can be noted that a prerequisite for implementing flexible rate increase and rate decrease by modifying the RWND is as follows: a TCP of the transmit end always meets: a congestion window (CWND)>an RWND, and the condition may be implemented by increasing a size of a TCP initial congestion window.

In addition, when the rate carried in the reverse data packet is less than a minimum rate of the first data stream that is stored in the device entries of the VS1, the VS1 may update the rate carried in the reverse data packet to a corresponding device entry.

It may be understood that, for a receive end, the VS2 may be a first-hop network device (that is, a second network device) that transmits the reverse data packet, and correspondingly, the SWn may be a second-hop network device, . . . , the SW1 may be an $n^{th}$-hop network device, and the VS1 may be a last-hop network device (in other words, SWn, . . . , SW1, and VS1 may be first network devices). Therefore, in a process in which each network device transmits a reverse data packet, steps 601 to 607 may be followed to feed back congestion of the reverse data packet.

It can be noted that the last-hop network device may add the minimum sending rate of the reverse data packet to the fourth and fifth bytes in the option B in the IP packet header, or may add the minimum sending rate of the reverse data packet to another option field. This is not limited in any embodiment.

In this way, when the first network device (that is, SW1, SW2, SWn, or VS2) determines that the first sending rate (the minimum sending rate of the first data stream that is determined by a previous-hop network device) is greater than or equal to the second sending rate (the sending rate of the first data stream that is determined by a current network device), the first network device may send a feedback packet to the second network device (that is, the VS1), where the feedback packet includes the second sending rate. After receiving the feedback packet, the second network device may instruct, based on the second sending rate and the minimum rate (the third sending rate) of the first data stream that is stored by the second network device for the last time, the transmit end to adjust the rate for sending the first data stream. Compared with the prior art in which end-to-end feedback is required, in this embodiment, before the first data packet of the first data stream arrives at a peer end, the second network device is enabled to instruct the transmit end to adjust the rate of the first data stream, so that a feedback time is shortened, and a problem of a long congestion feedback period and delayed congestion feedback caused by end-to-end feedback can be resolved.

The foregoing mainly describes the solutions provided in the embodiments from perspectives of the first network device and the second network device. It may be understood that, to implement the foregoing functions, the first network device and the second network device include corresponding hardware structures and/or software modules for performing the functions. A person of ordinary skill in the art should be aware that, in combination with the algorithm steps described in the embodiments disclosed in herein, embodiments can be implemented by hardware or a combination of hardware and computer software. Whether a function is performed by hardware or hardware driven by computer software depends on particular applications and design constraints of the technical solutions. A person of ordinary skill in the art may use different methods to implement the described functions for each particular embodiment, but it should not be considered that the implementation goes beyond the scope of the embodiments.

In the embodiments, the first network device and the second network device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It can be noted that, in the embodiments, module division is an example, and is merely a logical function division. In actual implementation, another division manner may be used.

When each function module is obtained through division based on each corresponding function, FIG. 11 is a possible schematic structural diagram of a first network device 11 in the foregoing embodiments. The first network device includes a receiving unit 1101, a processing unit 1102, and a sending unit 1103. The receiving unit 1101 is configured to support the first network device in performing the process 401 in FIG. 4 and the process 603 in FIG. 6. The processing unit 1102 is configured to support the first network device in performing the process 402 in FIG. 4 and the process 604 in FIG. 6. The sending unit 1103 is configured to support the first network device in performing the process 403 in FIG. 4 and the process 605 or 606 in FIG. 6. All content related to the steps in the foregoing method embodiments may be cited in function descriptions of corresponding function modules. Details are not described herein for the sake of brevity.

Referring to FIG. 12, a first network device 12 includes a processor 1201, a transceiver 1202, a memory 1203, and a bus 1204. The transceiver 1202, the memory 1203, and the processor 1201 are connected to each other through the bus 1204. The bus 1204 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 12, but this does not mean that there is only one bus or only one type of bus.

It can be noted that this embodiment may be, alternatively, a virtual first network device implemented based on a universal physical server with reference to a network function virtualization (NFV) technology. The virtual first network device may be a virtual machine on which a program with a function used to obtain and compare a data stream rate runs, and the virtual machine is deployed in a hardware device (for example, a physical server). The virtual machine is a complete computer system that is simulated by using software, that has functions of a complete hardware system, and that runs in a completely isolated environment.

When each function module is obtained through division based on each corresponding function, FIG. 13 is a possible schematic structural diagram of a second network device 13 in the foregoing embodiments. The second network device includes a receiving unit 1301 and a sending unit 1302. The receiving unit 1301 is configured to support the second network device in performing the process 403 in FIG. 4 and the processes 601, 605, and 606 in FIG. 6. The sending unit 1302 is configured to support the second network device in performing the process 404 in FIG. 4 and the process 607 in FIG. 6. All content related to the steps in the foregoing method embodiments may be cited in function descriptions of corresponding function modules. Details are not described herein for the sake of brevity.

Referring to FIG. 14, a first network device 14 includes a processor 1401, a transceiver 1402, a memory 1403, and a bus 1404. The transceiver 1402, the memory 1403, and the processor 1401 are connected to each other through the bus 1404. The bus 1404 may be a PCI bus, an EISA bus, or the like. The bus may be classified into an address bus, a data bus, a control bus, and the like. For ease of representation, only one thick line is used to represent the bus in FIG. 14, but this does not mean that there is only one bus or only one type of bus.

It can be noted that this embodiment may be, alternatively, a virtual second network device implemented based on a universal physical server with reference to an NFV technology. The virtual second network device may be a virtual machine on which a program with a function used to obtain and compare a data stream rate runs, and the virtual machine is deployed in a hardware device (for example, a physical server). The virtual machine is a complete computer system that is simulated by using software, that has functions of a complete hardware system, and that runs in a completely isolated environment.

Method or algorithm steps described in combination with the content disclosed in the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Further, the storage medium may be alternatively a component of the processor. The processor and the storage medium may be located in an ASIC. In addition, the ASIC may be located in a core network interface device. Additionally, the processor and the storage medium may alternatively exist in the core network interface device as discrete components.

A person of ordinary skill in the art should be aware that in the foregoing one or more examples, functions described may be implemented by hardware, software, firmware, or any combination thereof. When embodiments are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely implementations of the embodiments, but are not intended to limit the protection scope of the present invention. Any variation or replacement readily figured out by a person of ordinary skill in the art within the technical scope disclosed in the present invention shall fall within the protection scope of the present invention.

What is claimed is:

1. A method for implementing rate adjustment at a transmit end, comprising:

receiving, by a first network device, a first data packet sent by a previous-hop network device, the first data packet comprising a first required rate, a first deadline, and a first sending rate that correspond to a first data stream, and the first sending rate is used to indicate a minimum sending rate of the first data stream that is obtained by the previous-hop network device;

obtaining, by the first network device, a second sending rate of the first data stream based on the first required rate and the first deadline that correspond to the first data stream, and a second required rate and a second deadline that correspond to a second data stream; and sending, by the first network device, a feedback packet to a second network device when the second sending rate is less than the first sending rate, the feedback packet comprising the second sending rate, and the feedback packet is used to instruct the second network device to inform, based on the second sending rate, the transmit end to adjust a rate for sending the first data stream.

2. The method according to claim 1, further comprising:

sending, by the first network device, a second data packet to a next-hop network device, the second data packet comprising the first required rate, the first deadline, and the second sending rate.

3. The method according to claim 1, further comprising:

when the second sending rate is greater than or equal to the first sending rate, skipping the sending of the feedback packet by the first network device.

4. The method according to claim 3, further comprising:

sending, by the first network device, a second data packet to a next-hop network device, the second data packet comprising the first required rate, the first deadline, and the first sending rate.

5. A first network device, comprising:

at least one processor;

one or more memories coupled to the at least one processor and storing instructions for execution by the at least one processor, the instructions instruct the at least one processor to cause the first network device to:

receive a first data packet sent by a previous-hop network device, the first data packet comprising a first required rate, a first deadline, and a first sending rate that correspond to a first data stream, and the first sending rate is used to indicate a minimum sending rate of the first data stream that is obtained by the previous-hop network device;

obtain a second sending rate of the first data stream based on the first required rate and the first deadline that correspond to the first data stream, and a second required rate and a second deadline that correspond to a second data stream; and send a feedback packet to a second network device when the second sending rate is less than the first sending rate, the feedback packet comprising the second sending rate, and the feedback packet is used to instruct the second network device to inform, based on the second sending rate, a transmit end to adjust a rate for sending the first data stream.

6. The first network device according to claim 5, wherein the instructions instruct the at least one processor to cause the first network device further to:

send a second data packet to a next-hop network device, the second data packet comprising the first required rate, the first deadline, and the second sending rate.

7. The first network device according to claim 5, wherein the instructions instruct the at least one processor to cause the first network device further to:

skip sending the feedback packet when the second sending rate is greater than or equal to the first sending rate.

8. The first network device according to claim 7, wherein the instructions instruct the at least one processor to cause the first network device further to:

send a second data packet to a next-hop network device, the second data packet comprising the first required rate, the first deadline, and the first sending rate.

9. A second network device, comprising:

at least one processor;

one or more memories coupled to the at least one processor and storing instructions for execution by the at least one processor, the instructions instruct the at least one processor to cause the first network device to:

receive a feedback packet sent by a first network device, the feedback packet comprising a second sending rate, and the second sending rate is used to indicate a sending rate of a first data stream that is obtained by the first network device; and when the second sending rate is less than a third sending rate, instruct a transmit end to reduce a rate for sending the first data stream, wherein the third sending rate is a minimum sending rate of the first data stream that is stored by the second network device.

10. The second network device according to claim 9, wherein the instructions instruct the at least one processor to cause the first network device further to:

send an acknowledgment packet to the transmit end, the acknowledgment packet comprising a first receiver window (RWND), the first RWND is less than a second RWND, and the second RWND is used to indicate an RWND carried in a reverse data packet corresponding to a data packet of the first data stream.

11. The second network device according to claim 9, wherein the instructions instruct the at least one processor to cause the first network device further to:

when the second sending rate is greater than the third sending rate, instruct the transmit end to increase a rate for sending the first data stream.

12. The second network device according to claim 11, wherein the instructions instruct the at least one processor to cause the first network device further to:

send an acknowledgment packet to the transmit end, the acknowledgment packet comprising a third receiver window (RWND), the third RWND is greater than a second RWND, and the second RWND is used to indicate an RWND carried in a reverse data packet corresponding to a data packet of the first data stream.

* * * * *